Oct. 1, 1935.   G. A. BELDING   2,015,777

WINDMILL

Filed Nov. 8, 1934

Inventor
Guy A. Belding
By Joseph T. Juliet
Attorney

Patented Oct. 1, 1935

2,015,777

UNITED STATES PATENT OFFICE 2,015,777

WINDMILL

Guy A. Belding, Geneva, Ohio

Application November 8, 1934, Serial No. 752,169

2 Claims. (Cl. 170—60)

My invention relates to windmills and its object is to provide mechanism for mounting the wheel and associated elements on a suitable tower and for regulating the speed of the windmill wheel. A further object is to provide means for maintaining a fairly constant speed of rotation of the wheel in spite of a great variation in the velocity of the wind.

A still further object is to provide means for reducing the effective resistance of the windmill wheel against the wind currents as the velocity of these currents increases and thereby lessen the strain against the side of the windmill tower during high winds.

In devices of this same general character heretofore the same relative displacement of the wind currents was maintained with the increased velocity of wind. With my device, however, an increase in wind velocity effects a decrease in the displacement of the wind currents. The objects of the invention are obtained by providing means responsive to variations in the velocity of the wind currents for changing the pitch of the blades of the windmill wheel, thereby maintaining a substantially constant wheel velocity in spite of changes and fluctuations in wind velocity.

Heretofore windmill wheels have been kept in the proper rotary position about the tower to keep the wheel in the wind by means of tail pieces and vanes of different characters. My method of mounting the wheel is such that the wheel is always on the side of the tower opposite that from which the wind is coming. Simple balancing mechanism maintains the wheel in proper position so that it always is turned with the proper side of the wheel toward the wind.

Further objects and advantages will become apparent from the description which follows.

Figure 1:
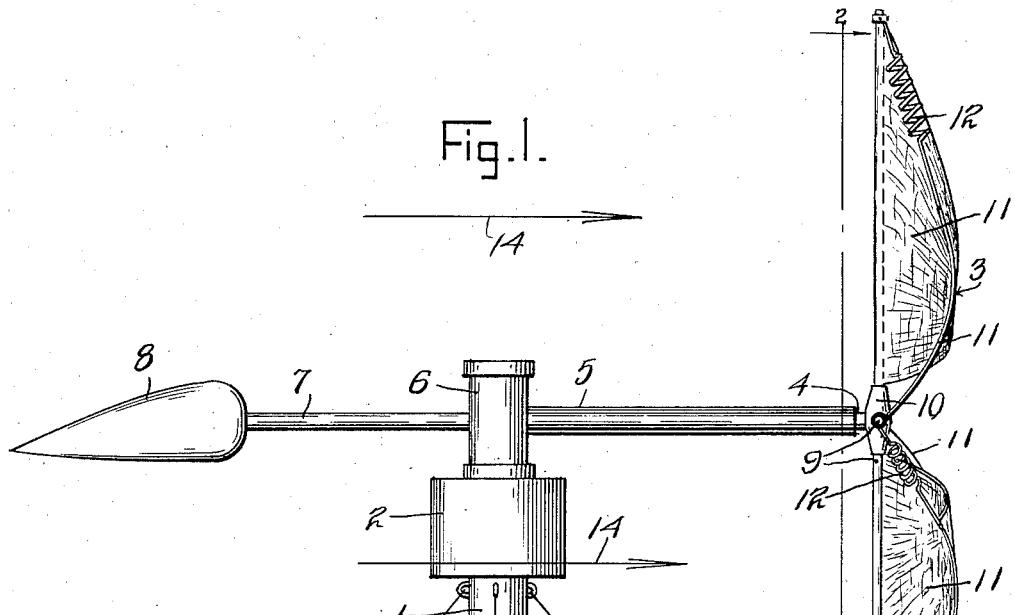
Figure 2:
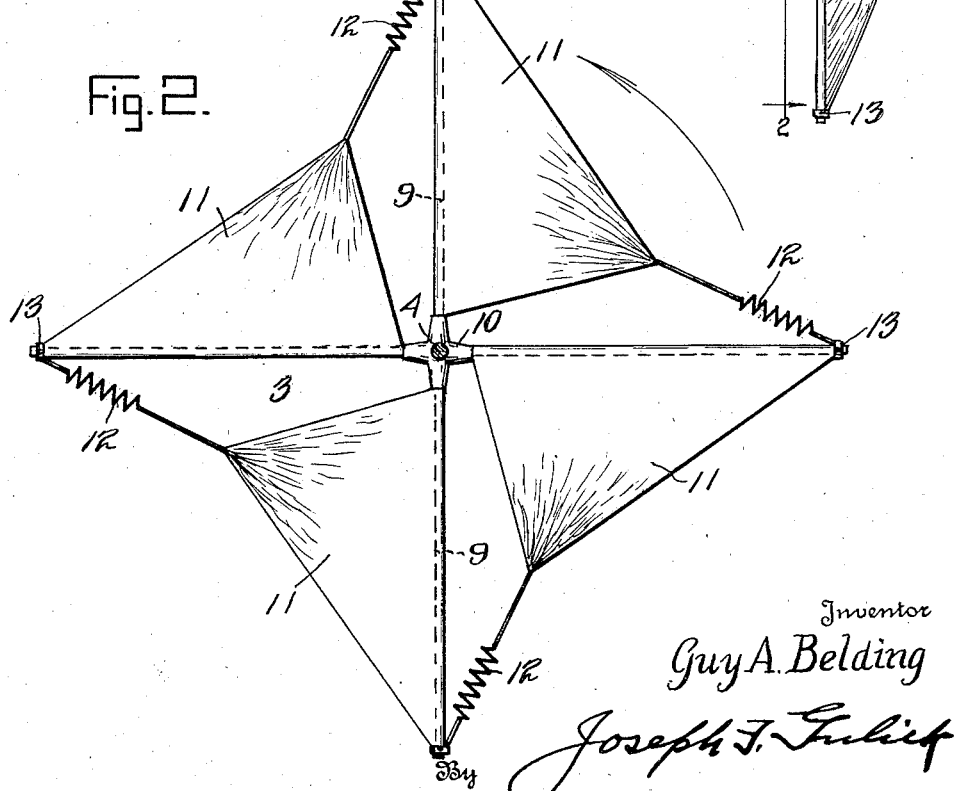

Referring to the accompanying drawing which is made a part hereof, and on which the same reference characters refer to similar parts throughout the specification, Figure 1 is a side elevation of my windmill, and Figure 2 is a front view of the windmill wheel.

In the drawing numeral 1 indicates the upper portion of a windmill tower of conventional or suitable construction, having a housing 2 in which are mounted suitable gear mechanisms with the necessary gear ratio devices for effecting the proper speed ratios between the windmill wheel and the driven devices. The windmill wheel 3 is carried on the end of a shaft 4 which shaft is journaled in a suitable housing 5. This housing is carried on a rotatable standard 6 which is supported in or upon the housing 2. A forwardly extending shaft 7 carries a weight 8, for counterbalancing the weight of the wheel 3.

The windmill wheel is formed of radially extending arms 9 which are secured to a hub 10 which is secured upon the shaft 4. Wheel blades or vanes 11 have one edge secured to the arms 9 and the other edge connected by resilient means 12 to the end of an adjacent arm 9. The resilient connecting means preferably includes a tension spring. The position of the vane or the tension of the resilient means may be regulated by an adjustable nut or screw 13. The vanes or blades 11 may be, and preferably are constructed of fabric which has been treated so as to coat it to make it less rough, thereby decreasing the friction of the wind upon its surface. When constructed of fabric the vanes are not unlike sails.

By virtue of the resilient connecting elements 12, the pressure of the wind upon the vanes will move them outwardly, to remove an effective portion of these sails from the path of the wind. The result of this movement should be apparent. With the sails set at a given angle and with a given wind velocity the windmill wheel will have a certain speed of rotation. With the vanes or blades kept at this angle and with an increase in the velocity of the wind there will be a corresponding increase in the speed of rotation of the windmill wheel. For many purposes it is desirable that the windmill wheel have a substantially constant speed. Now due to the yieldability of the elements 12 it will be apparent that an increase in wind velocity will put added pressure upon the vanes of blades 11 and this will cause these vanes to move outwardly, changing the pitch of these vanes. There will be a slightly higher pressure on the vanes, however, so that the wheel will maintain the same speed in spite of variations in the velocity of the wind.

I have shown my vanes as constructed of fabric because I have found this a most efficient construction. The fabric may be readily renewed when it becomes worn. I have found, however, that the alternating wetting and drying of the fabric of the vanes keeps them in good condition for a long while. One advantage of the fabric construction is that it makes a very light weight wheel. Even when driven at a high speed the effect of centrifugal force is relatively small. For certain installations, however, I may find it convenient to use pivotally mounted blades. My invention is therefore not limited to the use of fabric as blade material.

In construction in which the windmill wheel is moved to inoperative position added resistance is placed in the path of the wind. Devices are known wherein the speed of the wheel is attempted to be controlled by reversely pivoting the outer ends of the vanes. While this may operate to vary the speed of the wheel, it does so by imposing an added strain upon the side of the windmill tower. This added load is imposed at a time when the wind velocity itself is adding a load to the side of the tower. The danger of the strains against the tower is increased. The movement of the vanes in my wheel is such that there is a lessened lateral load against the side of the tower as the wind velocity increases. This, of course, is as it should be. The manner in which the wheel is mounted and counterbalanced makes the usual tail pieces unnecessary and simplifies construction and lessens the load necessary to be carried by the windmill tower.

It will be obvious to those skilled in the art to which my invention pertains that various modifications of the invention may be made without departing from the spirit of the invention or from the basic idea thereof. I, therefore, do not limit myself to the specific details of construction as shown in the drawing and described in the specification but only as contained in the appended claims.

What I claim as my invention and seek to protect by Letters Patent is:

1. A windmill wheel comprising a hub having radially extending arms thereon, vanes or blades secured along one edge to the said arms, resilient means secured to the opposite edges of the blades and to the outer ends of the arms next adjacent and so constructed and arranged that an increase in the velocity of the wind will cause the blades to swing to change the pitch of these blades.

2. A windmill having a shaft mounted upon and to swing horizontally about a vertical support, a hub on said shaft, radially extending arms on said hub, vanes formed of flexible material secured along one edge to said arms, tension springs secured at one end to the other edge of said vanes and at their other end to the outer end of the adjacent arm.

GUY A. BELDING.